Dec. 27, 1960 L. NORDWALD 2,966,210
FUEL CONTROL FOR GAS TURBINE POWER PLANTS
Filed June 11, 1956 2 Sheets-Sheet 2

INVENTOR.
LEO NORDWALD
BY Wade Koontz
 Sherman H. Goldman
ATTORNEYS

United States Patent Office 2,966,210
Patented Dec. 27, 1960

2,966,210

FUEL CONTROL FOR GAS TURBINE POWER PLANTS

Leo Nordwald, San Diego, Calif., assignor to the United States of America as represented by the Secretary of the Air Force Filed June 11, 1956, Ser. No. 590,798

6 Claims. (Cl. 158—36.4)

This invention relates to an engine fuel control system and more particularly to the utilization of a speed responsive device as a control for an overspeed control valve and as a control for an emergency fuel system.

It is necessary that overspeed protection and emergency control from landing to military power ratings be provided such that the pilot of a gas turbined aircraft will have control without loss of power during all maneuvers under all conditions. The emergency system, in order to provide the pilot with this necessary control, must be capable of immediate take-over upon main fuel system failure. It should be realized that even a small delay with its resulting decrease in thrust would seriously endanger the aircraft, especially during a wave-off or take-off.

Prior devices have used a governor for overspeed control and a separate pressure setting regulator as a speed control for the emergency system. Predetermined fuel input as a function of altitude was not found to be practical for overspeed protection because of the variations in the self-limiting effect of thermodynamic cycles. Pressure sensing devices as an emergency control do not sense engine r.p.m. and cannot correct for drifts or changes in other parts of the fuel system; furthermore, altitude compensation, which is done on a straight line basis with pressure change, aggravates the condition by resulting in engine drift with altitude change.

The instant invention has for its object the presentation of a device which meets the requirements enumerated above without the disadvantages present in existing systems.

A further object of this invention is the construction of a device which is both extremely accurate and reliable.

Another object of this invention is to reduce the number of parts with an improvement in result over conventional devices. One unit and associated valves replace what is currently done by two units and associated equipment.

Another object of this invention is the provision of an emergency fuel control that does not ordinarily interfere with the main system fuel scheduling.

A further object of the invention is the provision of a device which protects against stall at low critical altitudes during throttle bursts.

Another object of the invention is the provision of a speed sensing control which is manually adjustable for varying engine output.

These and other advantages, features and objects of the invention will become more apparent from the following description taken in connection with the illustrative embodiments in the accompanying drawings, wherein.

Figure 1:
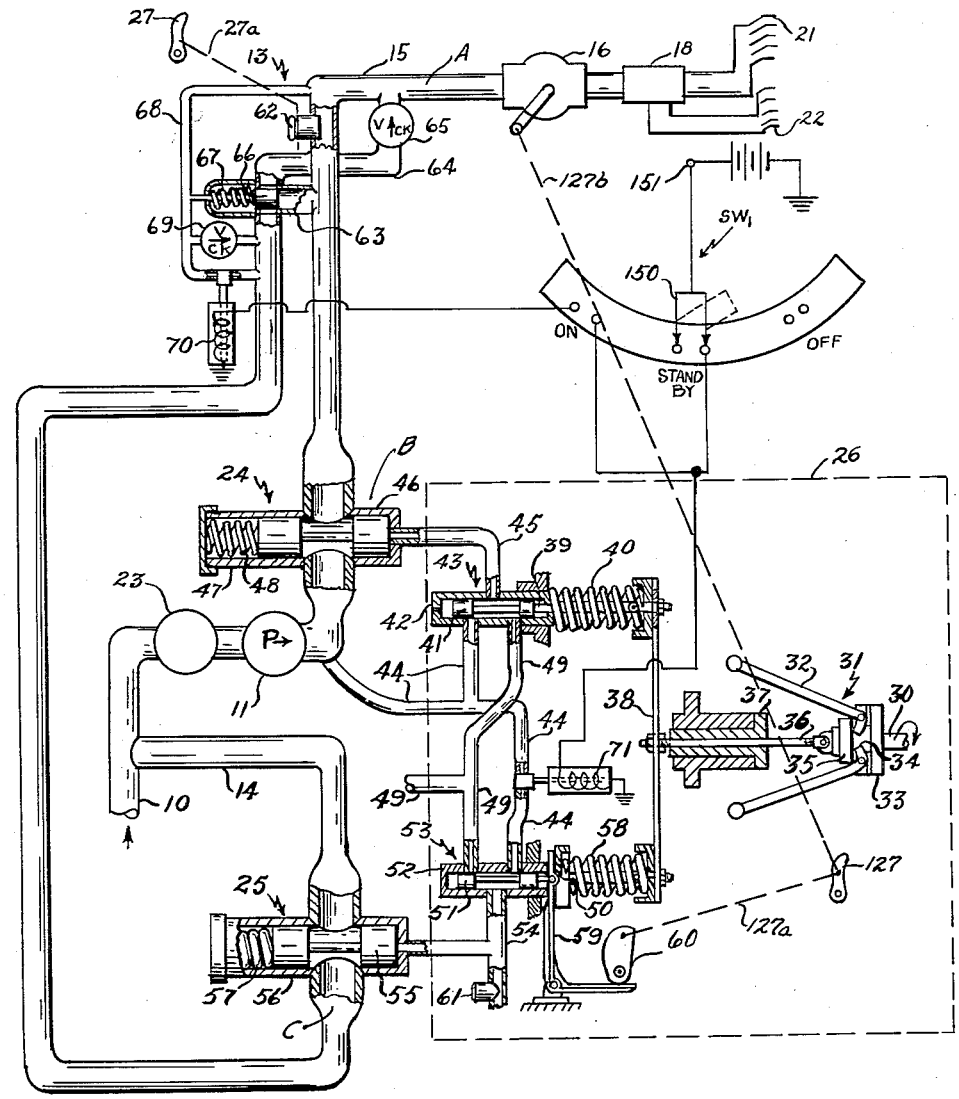
Fig. 1 is a diagrammatic illustration of a by-pass fuel system incorporating the new control system of this invention.

A basic bypass fuel system is illustrated in Fig. 1 and includes the control system of this invention. In conventional by-pass fuel systems, the fuel is stored in a fuel tank (not shown) and is piped from said tank through a conduit 10 to a main fuel pump 11 of the positive displacement type and thence to a valve system 13 containing a main fuel control valve by means of a conduit 12. A bypass line 14 is connected from the control valve system 13 to conduit 10. The output from the valve system 13 is directed through conduit 15 and stop cock 16 to a flow divider valve 18 by means of conduit 17 to a pair of sets of nozzles 21 and 22 by means of their respective conduits 19 and 20. The stop cock 16, which is either fully opened or fully closed provides positive cut-off for the engine nozzles.

The proposed system of this invention adds to the conventional by-pass system. A booster pump 23 is added to insure proper fuel delivery and units 24, 25, 26, 27, and 127 are added for the emergency control and overspeed protection.

An overspeed results when too much fuel reaches the engine causing an engine speed above a predetermined maximum, usually as a result of failure of the main fuel control valve of valve system 13 in an open position or a maladjustment of said valve which will result in no fuel being bypassed through the normal bypass line.

In order to prevent the overspeed condition, the fuel to the burner nozzles must be limited from point A on. The limiting may be accomplished by the placing of either a throttle governor or a bypass governor at either of positions A or B. In the preferred embodiment, a throttle governor 24 is used since a bypass governor could not allow a positive porting in case of an overspeed because of (a) excessive pressure drops with large flows and (b) an upset of normal fuel schedules if leakage in the bypass governor occurred at point A. The throttle governor is more positive in its action and less subject to its installation than a bypass governor. In the proposed system, when an overspeed condition occurs with no fuel being bypassed, the pressure upstream of the throttling governor 24 will rise until either the pump or control valve relief valves (not shown) open to bypass the excess fuel.

Because the flow at point B is essentially constant at pump flow and a governor schedule can be designed accordingly, the overspeed valve unit has been placed at point B with a governor having a fixed upper limit of speed regardless of the control setting for the engine speed. The unit, however, could be placed at position A.

A failure of the main fuel system at an increased power setting usually allows the pilot of the aircraft sufficient time to switch manually to the emergency control, the overspeed control automatically coming into play if the engine doesn't stall.

To accommodate for a power failure caused by the main fuel control valve of valve system 13 being in a fully closed position, thereby porting all the fuel through the bypass, it is necessary on main system failure to either restrict the bypass fuel flow at point A with control through a throttling type valve at point A or B, thereby bypassing the fuel through the pump relief valve (not shown), or by means of an emergency flow restricting device or modulating type valve 25 in the bypass line at point C.

In the preferred embodiment, the overspeed protection is provided by a throttling valve 24 at point B while the speed setting function is provided by flow restricting device 25 at point C. Both of these devices are operated by the same speed sensing control unit 26 which in combination with manual thrust selectors 27 and 127 completes the additions to the basic system depicted in Fig. 1.

The operation of both the overspeed and emergency control valves is schematically shown in Fig. 1. The speed sensing device comprises a conventional flyball governor 31 which is rotated by engine shaft 30 to operate a linkage-hydraulic system to control the overspeed control valve 24 and emergency control valve 25.

Arms 32 of the governor are pivotally mounted on rotating hub 33 on shaft 30. Bellcrank portions 34 of arms 32 bear on element 35 of linkage 36, 38, 39 and 50 which acts as a rigid linkage and is constrained to a straight line motion by bearing 37.

Assuming an overspeed condition, the linkage is biased to the left against the action of preset spring 40, which is set for the top speed or overspeed condition of the engine. Piston rod 39 of the linkage operates two interconnected pistons 41 in cylinder 42 of the pilot valve 43 to uncover an orifice in cylinder 42 to allow the high pressure control fuel in conduit 44 to pass through the cylinder 42 and connecting conduit 45 to actuate dual interconnected pistons 46 in cylinder 47 of overspeed control valve 24. A spring 48 biases pistons 46 to the right when pistons 41 cover the orifice to the high pressure control fuel line 44 and connect drain line 49 through its orifice in cylinder 42 with conduit 45.

Emergency control valve 25 is operated by governor 31 and linkage members 35, 36, 38 and piston rod 50. Dual interconnected pistons 51 in cylinder 52 of pilot valve 53 are attached to piston rod 50 and, depending upon their position, connect high pressure control fuel line 44 or drain line 49 with the interior of cylinder 52 and conduit 54 which in turn is connected to emergency control valve 25. Dual interconnected pistons 55 in cylinder 56, which are biased by spring 57 of the emergency control valve, operate in the same manner as overspeed control valve 24 when the high pressure control full line and drain line are connected thereto. A spring 58, which is manually adjustable by means of pivoted bellcrank 59 and cam 60 which is actuated by linkage 127a of emergency manual thrust selector 127 serves to provide for fuel control scheduling when the system is operating under emergency control; however, spring 58 exerts no pressure on element 38 unless cam 60 is moved from its zero position. A needle valve bleed 61 is provided between conduit 54 and a drain to provide burst stall protection by damping sudden pressure surges in conduit 54 thereby exerting a measure of control over the rate of fuel flow.

The valve system 13 which is depicted in Fig. 1 is used with the system and its components are involved in the discussion of the operation of the system. A cam positioned valve member 62, which is controlled by manual thrust selector 27, is placed between inlet 12 and outlet 15 and operates as the main fuel control valve. The bypass line 14 interconnects with inlet 12 by means of a conduit 63 and the outlet 15 by means of a conduit 64. A spring loaded check valve 65 is positioned in conduit 64 while a valve member 66, biased by a spring 67, is positioned at the intersection of conduits 14, 63 and 64 to control the flow from the main fuel line to the bypass line. A bypass pressure line 68 connects outlet 15 with the spring side of valve element 66 and also with bypass line 14 through a pressure relief valve 69 and a solenoid valve 70 in parallel therewith.

In order to prevent the emergency control from interfering with main system scheduling, a switch means $SW_1$, having double switch arm 150 pivotable about pivot 151, an indicator for controlling operation of the emergency control is provided. The three conditions for the emergency control are (a) stand-by, emergency control ready to take over; (b) on, emergency control in operation; and (c) off. Solenoid operated valves 70 and 71 are provided for controlling the condition of the emergency control, as is explained under the statements of operation relative to said control.

OPERATION (FIGURE 1)

Overspeed condition

The overspeed condition is produced by an overabundance of fuel being delivered to the engine either as a result of control valve system 13 calling for too much fuel or of control valve element 62 failing in the full open position. The resultant increased engine speed causes the arms 32 of flyball governor 31 to diverge and actuate linkage elements 35, 36, 38 and 39 to the left against the action of preset spring 40 to produce a movement of pistons 41 of the pilot control valve 43. This movement of pistons 41 covers the drain connection to the pilot control valve cylinder 42 and simultaneously opens the high pressure fuel line orifice so that it is in effect connected with conduit 45 such that its pressure acts against pistons 46 of the overspeed control valve. Movement of pistons 46 to the left reduces the flow of fuel in main fuel line 12 depending upon the amount pistons 41 have uncovered the high pressure fuel orifice of pilot valve 43.

When the overspeed condition is removed, arms 32 of the flyball governor tend to converge thereby allowing preset spring 40 to move linkage 35, 36, 38, 39 and pistons 41 to the right. This action closes the orifice to the high pressure control fuel line 44 and opens the orifice to drain line 49 thereby connecting it with conduit 45 and cylinder 47 of the overspeed control valve. Since the pressure has been relieved behind pistons 46, spring 48 biases said pistons to the right, opening the main fuel line 12.

When the overspeed condition occurs with element 62, which is normally actuated by thrust selector 27 and linkage 27a, in an open position, the pressure downstream of said element will be connected through bypass pressure line 68 to bias valve element 66; however, since the pressure upstream of valve element 62 would be higher, bypass valve element 66 would open thereby allowing some of the main fuel to be diverted through the bypass line 14. Relief valve 69 would also aid in reducing the pressure of bypass pressure line 68. The pressure in line 64 during the overspeed condition is insufficient to open check valve 65.

Emergency condition

The conditions under which the emergency control is to be operated depend on the position of the switch means $SW_1$ which controls solenoid operated valves 70 and 71. Energization of the solenoid 70 and 71 to bias the valve portions open is achieved by applying a potential to the solenoid.

When a "stand-by" condition is desired, solenoid 71 opens the high pressure fuel line 44 while solenoid 70 closes its passageway in bypass pressure line 68.

Assuming a failure of valve element 62 in a closed position, thereby tending to port all the fuel through the bypass line 14, the reduction of fuel to the nozzles and the resultant decrease in engine speed to a predetermined minimum would cause arms 32 of flyball governor 31 to converge and release the pressure against element 35. Under the action of spring 40, linkage 35, 36, 38 and 50 move to the right causing pistons 51 to uncover the orifice in cylinder 52 of pilot valve 53 thereby connecting the high pressure control fuel line 44 with conduit 54 and simultaneously blocking the orifice in cylinder 52 which connects with drain line 49. The pressure in conduit 54 forces pistons 55 in cylinder 56 of the emergency control valve 25 against the action of spring 57 to reduce the flow in bypass line 14 in accordance with the pressure applied. The reduction of fuel passing through bypass line 14 causes a pressure rise in conduit 64 sufficient to cause check valve 65 to open to allow the fuel to pass to outlet conduit 15, valve element 66 having been moved to the left due to the pressure difference between conduits 63 and 68. A rectification of the positioning of valve element 62 to allow a resumption of normal flow would increase the speed of the engine thereby causing a release of the pressure against spring biased pistons 55 since drain line 49 has in effect been connected with conduit 54 while high pressure control fuel line 44 has been shut off.

When the emergency control switch $SW_1$ is manually moved to the "on" position, solenoid operated valves 70 and 71 are both opened. Solenoid operated valve 70 in its open position allows a relief of the pressure in bypass pressure line 68 so that valve element 66 opens. Control by varying the amount of fuel bypassed is accomplished by adjustment of emergency control valve 25. Cam 60, bellcrank 59, emergency thrust selector 127 and linkage 127a are used to control the fuel schedule for changing the engine speed by varying the pressure exerted on spring 58 which biases linkage element 38 thereby effecting a control of the position of emergency control valve pistons 55 in the bypass flow line 14.

The actuation of solenoid 70 and the resultant opening of valve element 66 which is biased by spring 67 serves as a ground checkout of the emergency system when it is used in aircraft.

The emergency "off" position produces a closure of high pressure control fuel line 44 by solenoid valve 71 so that pistons 55 will not be moved to the left. Solenoid operated valve 70 closes passageway 68 when the emergency "off" position is being used. Disabling of the emergency control avoids interference with the main fuel schedule.

Figure 2:
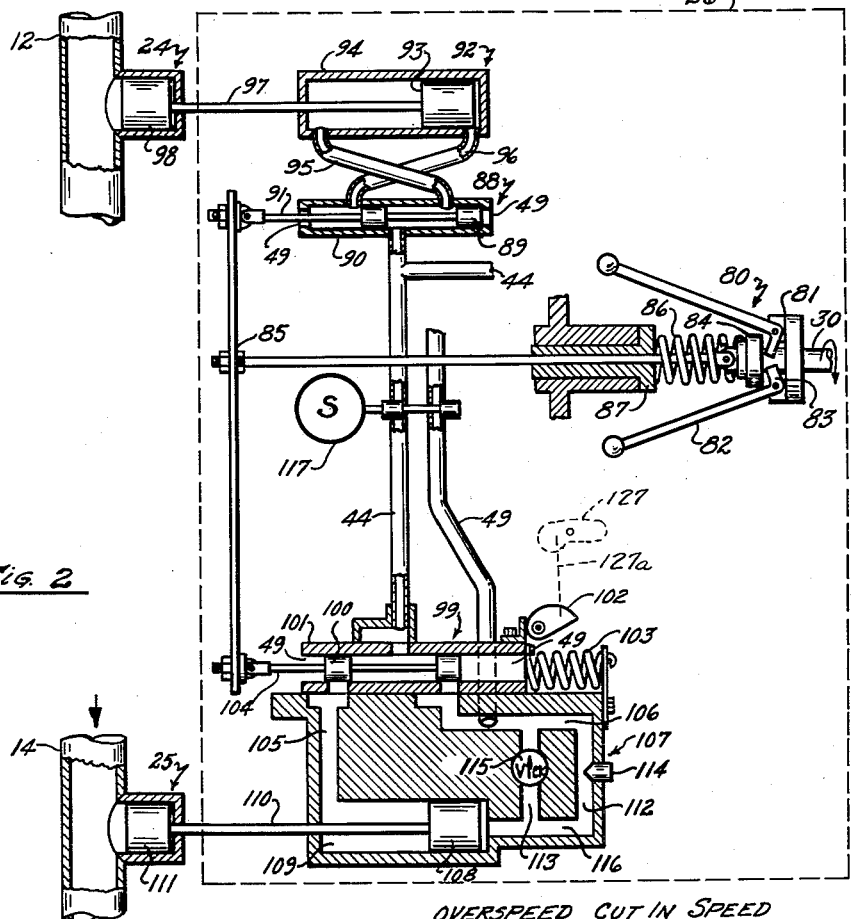
Fig. 2 is a diagrammatic illustration of an alternative embodiment of the new control system.

The embodiment of Fig. 2 illustrates a position servo-type valve system for speed sensing control 26, wherein servo control is introduced by means of a flyball governor 80. Engine shaft 30 rotates hub 81 to which arms 82 of flyball governor are pivotally attached. Arms 82 have bellcrank portions 83 which bear on spring biased element 84 of rigid, generally T-shaped linkage 85. Linkage biasing spring 86 is preset for the top speed or overspeed of the engine while bearing 87 constrains linkage 85 to a straight line motion. A pilot valve 88 containing dual pistons 89 in cylinder 90 is controlled by linkage 85 by means of piston rod 91. A power piston unit 92 consisting of a piston 93 in a cylinder 94 is interconnected with pilot control valve 88 by means of conduits 95 and 96. Piston rod 97 interconnects piston 93 of power unit 92 with a piston-type valve element 98 of the overspeed control valve 24. A high pressure control fuel line 44 is connected to cylinder 90 of pilot valve 88 while the cylinder ends are connected to drain line 49 to complete the overspeed protection unit.

The emergency control section of the speed sensing control unit 26 consists of a pilot valve 99 with dual interconnected pistons 100 in a cylinder 101. Cam 102, operated by emergency manual thrust selector 127 and linkage 127a, bears against cylinder 101 to vary its position while spring 103 biases the cylinder against the cam. High pressure control fuel line 44 and drain lines 49 connect with cylinder 101 while piston rod 104, which is rigidly connected with linkage 85 for control by flyball governor 80, varies the movement of pistons 100 to connect high pressure fuel line 44 and drain lines 49 with conduits 105 and 106 in power piston unit 107. Power piston unit 107 houses piston 108 in cylinder 109 which, together with piston rod 110, controls a piston-type valve element 111 of the emergency control valve 25. Conduit 105 connects with one side of piston 108 in cylinder 109 while conduit 106 joins with the other side of piston 108 by means of a pair of conduits 112 and 113 and conduit 116. Conduits 112 and 113 contain a needle valve 114 and check valve 115, respectively, for burst stall protection. Conduit 106 is connected with drain line 49 which, together with high pressure fuel conduit 44, contains valve elements of a solenoid operated valve 117.

OPERATION (FIGURE 2)

Overspeed condition

When the engine is operated at an overspeed, the arms 82 of flyball governor 80 assume a diverged position against the action of spring 86 which move linkage 85 to the left by the pressure of bellcrank portions 83 against element 84. Movement of linkage 85 is transmitted to pistons 89 in cylinder 90 of pilot valve 88 by means of piston rod 91. This movement uncovers the orifice to conduit 96 thereby connecting it with high pressure control fuel line 44 and simultaneously connects conduit 95 with a drain. Power piston 93 then moves to the left with piston rod 97 to produce a movement of valve element 98 toward a closed position. When the cause of the overspeed condition is removed the reduction of engine speed causes a convergence of arms 82. Preset spring 86 then causes a movement of linkage piston rod 91 and pistons 89 to the right which connects conduit 96 to a drain and 95 to high pressure control fuel line 44.

Emergency condition

Valve 117 in Figure 2 is connected in the same manner as 71 described relative to Figure 1, such that its energization is achieved by applying a potential to its solenoid to bias it to the left as seen in Figure 2. When a "stand-by" condition is desired, solenoid operated valve 117 closes drain line 49 and opens high pressure control fuel line 44. Convergence of arms 82 of flyball governor 80 allows movement of linkage 85 to the right under the action of preset spring 86. Movement of the linkage through piston rod 104 controls pistons 100 to connect passageway 106 with high pressure fuel conduit 44 and passageway 105 to a drain. The high pressure fuel causes a movement of piston 108 with piston rod 110 and valve element 111 to the right to close bypass line 14. A momentary surge by needle valve 114 would open spring biased check valve 115 for an instant to allow flow in the direction of the arrow to equalize the pressure.

The emergency "on" position operates solenoid operated valve 117 such that conduits 44 and 49 are opened and closed, respectively. Valve system 13 operates in the same manner with the instant embodiment as with that described with reference to Fig. 1. Control of emergency control valve 25 is then set by the position of cylinder 101 of pilot valve 99 by means of cam 102 which is operated by thrust selector 127 and linkage 127a. Movement of cylinder 101 to the left aids in advancing the closing of emergency control valve 25 to obtain a particular speed.

The emergency "off" condition operates solenoid operated valve 117 to close high pressure control fuel line 44 and open drain line 49.

Figure 3:
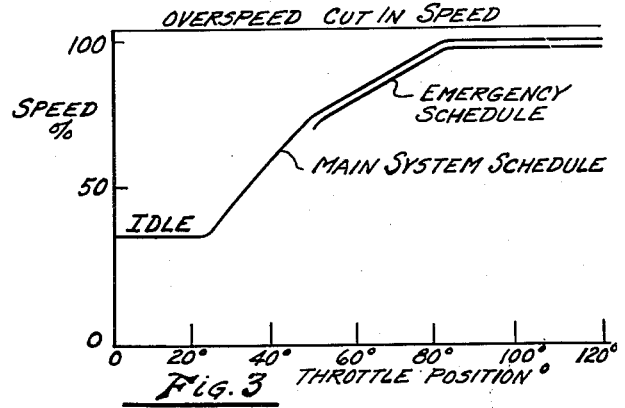
Fig. 3 is a representation of a typical fuel schedule with my invention incorporated in a fuel system.

Fig. 3 shows a typical schedule for main system, emergency control, and overspeed plotted against throttle position.

Stop cock 16 by means of linkage 127b, if desired, may be interconnected for operation with emergency thrust selector 127 as schematically represented in Figure 1, whereby the first few degrees of movement of element 127 opens stop cock 16 to its full open position. The construction of 16 corresponds to that of the shut-off valve described in Patent Number 2,695,055 to I. G. Cruckshank. When the prime mover is operating under emergency control, a positive shut-off is desirable since reduction of engine speed tends to cause activation of the emergency control valve 25.

Although the invention has been described with reference to particular embodiments, it will be understood to those skilled in the art that the invention is capable of a variety of alternative embodiments within the spirit and scope of the appended claims.

I claim:

1. A fuel control system for controlling fuel flow to a prime mover, said fuel system comprising a main fuel line containing a pump and main fuel control valve, a by-pass line from the inlet of said main fuel control valve to the inlet of said pump, an overspeed control valve in said main line downstream of said pump for reducing fuel flow through said main line from said pump when the prime mover is operated above a predetermined maximum speed, an emergency control valve in said by-pass line for augmenting main fuel flow by restricting by-pass flow when the prime mover is operating at an unsafe reduced speed, a biased check valve connected between the inlet of said main fuel control valve and the outlet of said main fuel control valve, said check valve being operative to conduct fuel from the inlet to the outlet of said main fuel control valve when the pressure difference between the inlet and outlet of said main fuel control valve exceeds a predetermined amount, and speed responsive means operated in response to the speed of the prime mover and connected to said emergency control valve and said overspeed control valve for controlling operation of said valves.

2. A system as set forth in claim 1 including manually adjustable means connected with said speed sensing means for controlling the operative position of said emergency control valve.

3. A fuel system and control therefor comprising a prime mover, a main fuel line connected with said prime mover for delivering fuel thereto, a fuel pump in said main fuel line, a main fuel control valve in said line between said pump and prime mover, a by-pass line from the inlet of said pump to the inlet of said main fuel control valve, an overspeed control valve in said main line downstream of said pump, an emergency control valve in said by-pass line, a valve connected between the inlet and outlet of said main fuel control valve operable to by-pass fuel around said main fuel control valve when a predetermined fuel pressure difference between the inlet and outlet of said main fuel control valve occurs, and speed sensing means responsive to the speed of said prime mover for operating said emergency control valve to effect an augmenting of fuel flow to said prime mover at a predetermined minimum speed and for operating said overspeed control valve to effect a limiting of fuel flow to said prime mover at a predetermined maximum speed.

4. A system and control therefor as set forth in claim 3, including means for selectively disconnecting operation of said emergency control valve by said speed sensing means.

5. A system and control therefor as set forth in claim 4, including manually operative means for biasing said speed sensing means to vary its operative effect on said emergency control valve, thereby varying fuel flow to said prime mover.

6. A system and a control therefor as set forth in claim 5, including means for selectively rendering said emergency control valve responsive to said manually operative means regardless of said predetermined minimum speed.

References Cited in the file of this patent

UNITED STATES PATENTS

| 2,533,231 | Drake | Dec. 12, 1950 |
| 2,628,672 | Silvester | Feb. 17, 1953 |
| 2,658,330 | Carey | Nov. 10, 1953 |
| 2,668,416 | Lee | Feb. 9, 1954 |
| 2,691,268 | Prentiss | Oct. 12, 1954 |
| 2,693,081 | Russ | Nov. 2, 1954 |
| 2,695,055 | Cruckshank | Nov. 23, 1954 |
| 2,700,872 | Lee | Feb. 1, 1955 |
| 2,782,769 | Best | Feb. 26, 1957 |
| 2,874,765 | King | Feb. 24, 1959 |

FOREIGN PATENTS

| 727,201 | Great Britain | Mar. 30, 1955 |

UNITED STATES PATENT OFFICE
CERTIFICATION OF CORRECTION

Patent No. 2,966,210                                      December 27, 1960

Leo Nordwald

It is hereby certified that error appears in the above numbered patent requiring correction and that the said Letters Patent should read as corrected below.

Column 2, line 1, strike out "ventional by-pass fuel systems, the fuel is stored in a fuel" and insert the same after "In con-" in line 2, same column; column 3, line 63, for "an" read -- and --.

Signed and sealed this 29th day of August 1961.

(SEAL)
Attest:

ERNEST W. SWIDER                                              DAVID L. LADD
Attesting Officer                                              Commissioner of Patents